United States Patent
Quast

[11] Patent Number: 5,386,977
[45] Date of Patent: Feb. 7, 1995

[54] HYDRAULICALLY DAMPING ENGINE MOUNTING

[75] Inventor: Jörn-Rainer Quast, Sinzig, Germany

[73] Assignee: Boge GmbH, Bonn, Germany

[21] Appl. No.: 153,583

[22] Filed: Nov. 16, 1993

[30] Foreign Application Priority Data

Nov. 17, 1992 [DE] Germany .............................. 4238752

[51] Int. Cl.⁶ ............................................. F16F 13/00
[52] U.S. Cl. .................................. 267/140.13; 267/219
[58] Field of Search .................... 267/140.11–140.15, 267/219; 298/562, 566; 180/300, 312, 902

[56] References Cited

U.S. PATENT DOCUMENTS

| | | | |
|---|---|---|---|
| 4,720,084 | 1/1988 | Hollerweger et al. | 248/562 |
| 4,802,648 | 2/1989 | Decker et al. | 267/140.15 |
| 4,886,252 | 12/1989 | Häussermann | 267/140.13 |
| 4,986,510 | 1/1991 | Bellamy et al. | 267/140.13 |
| 5,205,546 | 4/1993 | Schister et al. | 267/140.13 |
| 5,246,212 | 9/1993 | Funahashi et al. | 267/140.13 |

FOREIGN PATENT DOCUMENTS 3446725 7/1986 Germany .

*Primary Examiner*—Robert J. Oberleitner
*Assistant Examiner*—Chris Schwartz
*Attorney, Agent, or Firm*—Nils H. Lungman & Associates

[57] ABSTRACT

A hydraulically damping engine mount has two fluid-filled chambers and a connection passage located in a partition between the two chambers. The mount also has an additional flexible wall which encloses an intermediate space, which intermediate space can be evacuated by means of at least one flow connection to alter the damping characteristic of the mount. For this purpose, the flow connection has a check valve and a switch.

6 Claims, 5 Drawing Sheets

HYDRAULICALLY DAMPING ENGINE MOUNTING

BACKGROUND OF THE INVENTION

1. Field of the Invention

This invention relates to a hydraulically damping engine mounting with fluid-filled chambers at least partly bordered by elastic walls, and a membrane with limited excursion capability separating the membranes, with at least one passage connecting the chambers, whereby the bearing characteristic can be adjusted by changing the rigidity of a flexible wall located in one of the chambers which, at low rigidity, works against a gas volume enclosed in an intermediate space, and which at high rigidity comes into at least partial contact against a stop.

2. Background Information

Such engine mountings are disclosed, for example, by German Patent No. 34 46 725, in which there is a partition between the two chambers, and in which one of the chambers has a ring-shaped elastic membrane running along the outside wall thereof. The intermediate space formed between the elastic membrane and the rigid outer wall can be pressurized with an underpressure to achieve a high rigidity of the engine mounting. When the engine mounting is to be switched to a harder characteristic for travel, it is necessary to apply an underpressure to the intermediate space, so that the elastic wall is in direct contact against the outside wall of the engine mounting.

One disadvantage of this system is that the generation of the underpressure in the intermediate space presents problems. These problems generally arise due to the necessity of using rigid lines between the evacuation device and the mounting, as flexible feed lines were found to collapse when an underpressure was applied. Further, for reasons relating to safety, it is not possible to install bleeds or taps in the brake line. Moreover, a long feed line, even one of rigid construction, has the disadvantage that the flexible wall can only come into contact with the rigid stop after sufficient air has been been sucked out of both the intermediate chamber, as well as the underpressure line. All of these disadvantages show that the pressurization of the intermediate chamber with an underpressure has not been suitable for use in actual practice.

OBJECT OF THE INVENTION

The object of the present invention is to create a hydraulically damping engine mounting having a simple and safe control device which can enable the mounting to be optionally set for a hard or soft characteristic, wherein, not only is the invention easy and economical to manufacture, but the location of the simple and safe control device in the immediate vicinity of the engine mounting eliminates the need for long de-pressurization lines.

SUMMARY OF THE INVENTION

The present invention teaches that this object can be achieved by making it possible to evacuate the intermediate space by means of at least one flow connection. The flow connection can preferably have a check valve for letting air escape out of the intermediate space, and can also preferably have a switch for providing an opening into the flow connection to pressurize the intermediate space.

One advantage of this system, in the event that the engine mounting is to be switched to its hard characteristic, is that the intermediate space, which is used to influence the suspension characteristic, can essentially be evacuated without further outside means. This self-evacuation essentially can take place any time that the mounting is in operation. During operation, the elastic walls of the mounting essentially enable a pumping action to Occur on account of decompression and compression movements of opposite ends of the mounting. During compression movements, the internal pressure essentially builds up and acts on the flexible wall. This can then result in the pushing of air out of the intermediate space via the check valve, to thereby evacuate the intermediate space. Such evacuation of air can essentially take place until the flexible wall comes into contact with a rigid component, or wall of the mounting. For the aeration, or letting of air back into the intermediate space, the switch must be activated to maintain an open passage into the intermediate space. This open passage essentially enables the intermediate space to be put into communication with a pressure source, i.e., the atmosphere. The flexible wall can then typically move back into a more relaxed configuration, or even back into its rest, or base configuration. The result is a simple, safe control principle, in which the elastic walls, by means of their pumping action, pump out the intermediate space by means of the check valve, while when the switch is activated, gas can flow back into the intermediate space from the atmosphere or other pressure reservoir.

In accordance with one embodiment of the present invention, the switch can preferably be operated by at least one of: manually, electromagnetically, pneumatically or hydraulically.

In one embodiment which has advantages in terms of manufacturing, two flow connections can preferably empty into a single flow connection, which single flow connection is connected to the intermediate space. In this case, the common flow connection can preferably be a component of the engine mounting itself, while the two individual flow connections, which are preferably equipped with the switch and the check valve, as discussed previously can be located outside of the engine mounting. It could also be conceivable to have the the two individual flow connections as a part of the engine mounting if one would so desire.

In accordance with another essential characteristic feature of the present invention, the check valve and switch can be integrated into a single component valve.

In one configuration of the invention, when an electromagnetic switch is used, the magnet armature can preferably be configured directly or indirectly as a switch. In this case, it is advantageous if the magnet armature, which closes the switch by acting on a spring, is designed as a check valve.

One essential characteristic feature is that the cross section of the flow connection is designed so that an unobstructed gas feed to the intermediate space can generally be provided.

In one favorable configuration, the switch can preferably be controlled as a function of the engine speed of a motor vehicle. That means that it becomes possible to influence the characteristic of the engine mounting as a function of the engine speed.

To prevent settling of the flexible wall after the engine has been stopped for a rather long period of time, the control system can preferably automatically aerates the intermediate space after the vehicle has been stopped for a long time. Such a control system essentially only needs to energize the switch for a short period of time, so that the switch opens the passage to allow air back into the intermediate space. When the switch is de-energized, it essentially moves back into the closed position, preferably by means of a resilient member, such as a spring.

An additional control of the suspension characteristics of the engine mounting can be achieved by connecting the flow connections to a pressure reservoir. The pressure reservoir can preferably be connected downstream of the check valve, so that it essentially becomes possible to aerate the intermediate space only using the switch.

One aspect of the invention resides broadly in a hydraulic damping engine mount for damping transmission of vibrations between an engine and a frame to which the engine is mounted. The mount has a damping rigidity, and the mount comprises a first attachment device for attaching the mount to the frame, a second attachment device for attaching the mount to the engine, and at least one elastic wall disposed between and connecting the first attachment device and the second attachment device. The first attachment device, the at least one elastic wall and the second attachment device comprise exterior surface portions of the mount and enclose an interior space within the mount. The interior space is bordered by an interior surface, and the mount includes a first flexible member disposed within the interior space in spaced apart relationship from the interior surface. The first flexible member defines a first chamber within the interior space between the flexible member and the interior surface, and the mount comprises a fluid within the first chamber, valve apparatus for releasing fluid from the first chamber to increase the damping rigidity of the mount and for admitting fluid back into the first chamber to decrease the damping rigidity of the mount, apparatus for controlling the valve device to control release of fluid from the first chamber and control admission of fluid back into the first chamber; and the valve device is disposed immediately adjacent the exterior of the mount.

Another aspect of the invention resides broadly in a hydraulic damping bearing for damping transmission of vibrations between a first object and a second object. The bearing has a damping rigidity, and the bearing comprises a first attachment device for attaching the bearing to the first object, a second attachment device for attaching the bearing to the second object, and at least one elastic wall disposed between and connecting the first attachment device and the second attachment device. The first attachment device, the at least one elastic wall and the second attachment device comprise exterior surface portions of the beraing and enclose an interior space within the bearing. The interior space is bordered by an interior surface, and the bearing further includes a first flexible member disposed within the interior space in spaced apart relationship from the interior surface. The first flexible member defines a first chamber within the interior space between the flexible member and the interior surface, and the bearing further copmprises a fluid within the first chamber, a first fluid passage from the first chamber to the exterior of the bearing, and a valve device configured for releasing fluid through the first passage out of the first chamber and admitting fluid through the first passage back into the first chamber. The valve device comprises a check valve configured for providing one-directional flow of fluid out of the first chamber via the first fluid passage at a first predetermined fluid pressure within the first fluid chamber to thereby evacuate the first chamber and increase the rigidity of the bearing, and apparatus for opening the the first fluid passage to admit fluid back into the first chamber to decrease the damping rigidity of the bearing.

BRIEF DESCRIPTION OF THE DRAWINGS

Preferred embodiments of the present invention are schematically illustrated in the accompanying drawings, in which.

DESCRIPTION OF THE PREFERRED EMBODIMENTS

Figure 1:
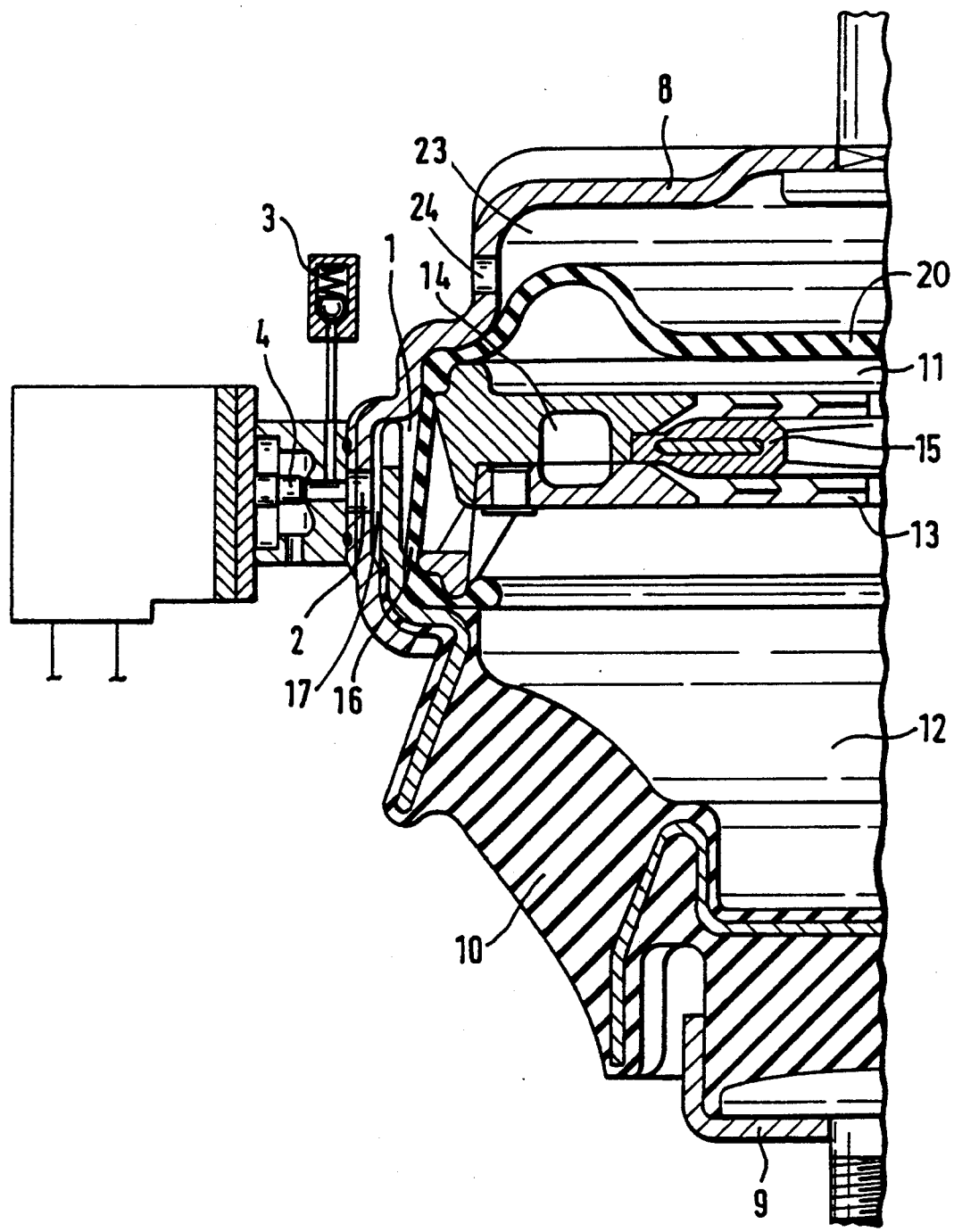
FIG. 1 shows a partial sectional view of an engine mounting, with a check valve and a valve controlled by a switch.

A hydraulically damping engine mounting is generally illustrated in FIG. 1. The illustration shown, is essentially a half view of the engine mounting, wherein the other half can be essentially the same. An engine mounting can preferably have fastening parts 8 and 9 for fastening the mounting to the engine and the motor vehicle frame. Between the connection parts 8 and 9 there can preferably be at least one elastic circumferential wall 10, which wall 10, together with the connection parts 8 and 9 can define an interior space therebetween.

The interior space can preferably be separated into two chambers 11 and 12 by means of a partition 13, and the chambers 11 and 12 can be filled with a damping fluid. The two chambers 11 and 12 can also be connected by means of a passage 14, which passage 14 can preferably be disposed through the partition 13, and preferably along at least a portion of the circumference of the partition 13. The chamber 11 can be bordered, on its side opposite the partition 13, by a flexible membrane 20, which can preferably allow the chamber 11 to expand as fluid is pushed from chamber 12 into chamber 11 during a compression of the mounting. The flexible membrane 20 defines an air space 23 between the connection part 8 and the flexible membrane 20. The connection part 8 can also have an orifice 24 for connecting the air space 23 to the atmospheric air. The partition 13 can also preferably have an additional flexible membrane 15, which membrane 15 can preferably isolate high frequency vibrations with small amplitudes. Since additional structural features of such a device are generally known, further specific details there regarding are not included in this application.

Along a radially peripheral area of the mounting, there can preferably be a flexible wall 16 which partitions off an intermediate space 1 between the flexible wall 16 and an interior wall 17 of the mounting. This intermediate space 1 can preferably be connected by means of a flow connection 2, to at least a check valve 3, and a switched valve 4, which can be either manually or automatically activated. In order to provide a desired operation of the engine mounting, the flexible wall 16 should preferably be softer than the membrane 15. In other words, the flexible wall 16 should preferably be less rigid than the membrane 15. As such, when the connection element 9 is pushed towards the connection element 8, via the elastic wall 10, a pumping action is produced. As a result of this pumping action of the elastic circumferential wall 10, the flexible wall 16 preferably comes into contact with the inner wall 17 before the membrane 15 can isolate any corresponding vibrations. In other words, the membrane 16 is configured to be movable during evacuation of the intermediate space 1 until at least a portion of membrane 16 contacts the inner wall 17 of the mount, and the membrane 15 is configured to be movable after at least a portion of the membrane 16 contacts the inner wall 17.

As a result of the pumping action produced by the elastic circumferential wall 10, first when the switch 4 is closed, there can preferably be an evacuation of the intermediate space 1. That is, when the pumping action produces a pressure in the intermediate space which is sufficient to overcome a pressure of a check valve 3, the check valve 3 can open, and enable fluid to flow out of the intermediate space. When the pressure in the intermediate space 1 drops below the activation pressure of the check valve 3, the check valve 3 preferably closes, so that fluid preferably cannot return into the intermediate space 1. Thus, the check valve 3 essentially opens when pressure peaks occur, and closes again when the pressure subsides. This process can then be repeated until the intermediate space 1 is substantially evacuated, or when at least a portion of the flexible wall 16 comes into contact with the metal side wall 17. In this embodiment, the fluid can escape from the intermediate space 1 by means of the check valve 3 into the surroundings. In other words, if the fluid is simply air, the air can escape back into the atmosphere.

When it is desired to soften the damping characteristics of the mounting, this can preferably be done simply by opening the switched valve 4. As such, fluid, i.e. air, or gas, can once again flow from the atmosphere past the switched valve 4 and back into the intermediate space 1, so that the flexible wall 16 moves into the position illustrated, which can be termed the rest position of the flexible wall 16.

Figure 1A:
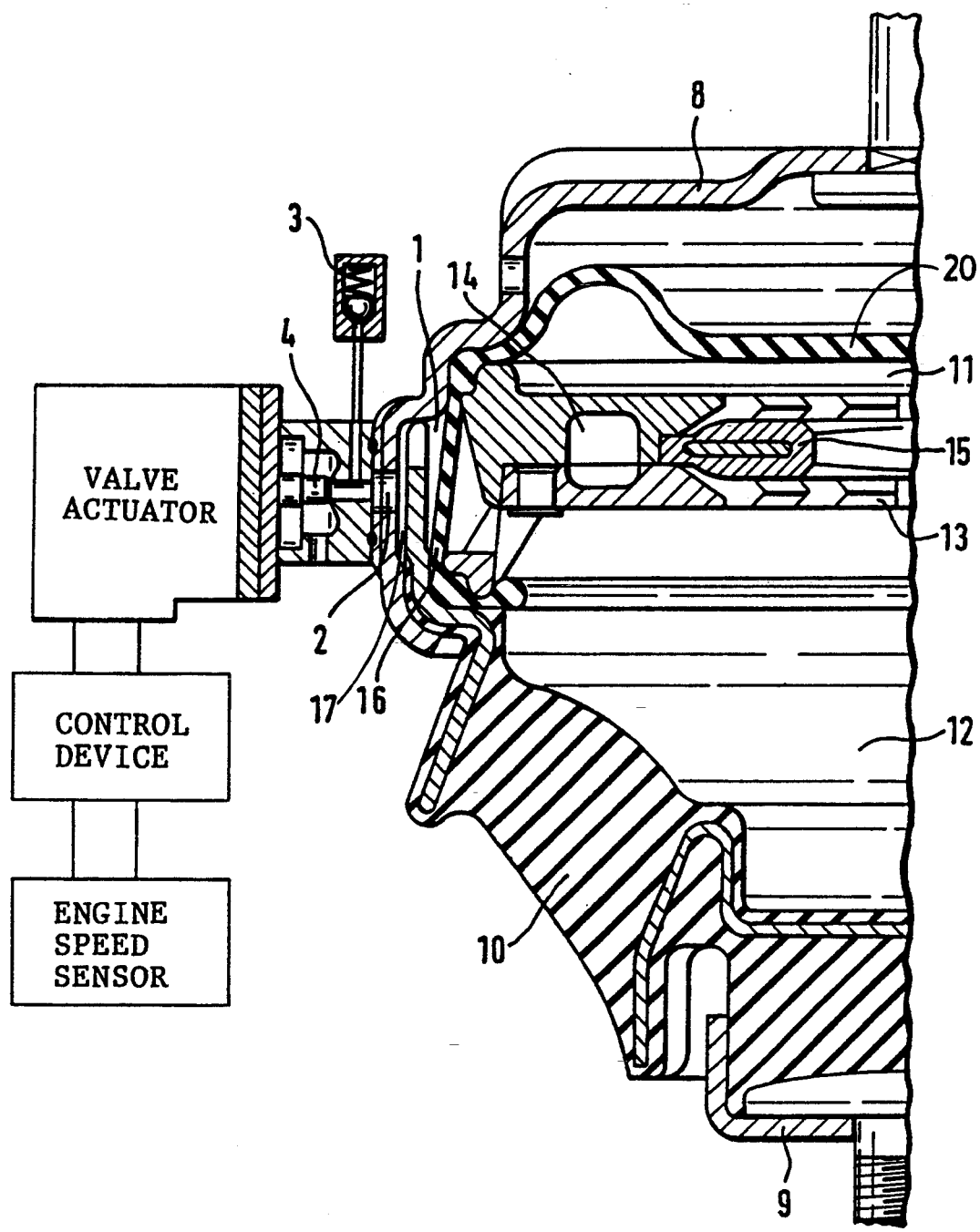
FIG. 1a shows a variant having control apparatus for controlling operation of the switch.

FIG. 1a essentially shows the same view of the engine mounting as shown in FIG. 1, but also depicts control devices which can optionally be used to control the function of the switched valve 4. In general, at low engine speeds, such as when an engine is started up and is in an idle mode, it is desired to have a lower damping characteristic, or rigidity, of the mounting to absorb more pronounced vibrations of the engine. As such, the switched valve 4 can be maintained in an open position. However, during travel, or when the engine would be operating at higher speeds, it may be more desirable to have a higher rigidity to isolate higher frequency vibrations. The switched valve 4 would therefore preferably be closed to allow evacuation of the intermediate space 1. Such a control of the switched valve 4 can be effected by means of appropriate control device, which may include a speed sensor and control as indicated in FIG. 1a. The speed sensor can monitor the engine speed, and when the speed reaches a certain level, a control signal can be sent by the control device to close the switched valve 4. Similarly, once the speed of the engine drops below a certain value, the control device can open the switched valve 4.

Figure 2:
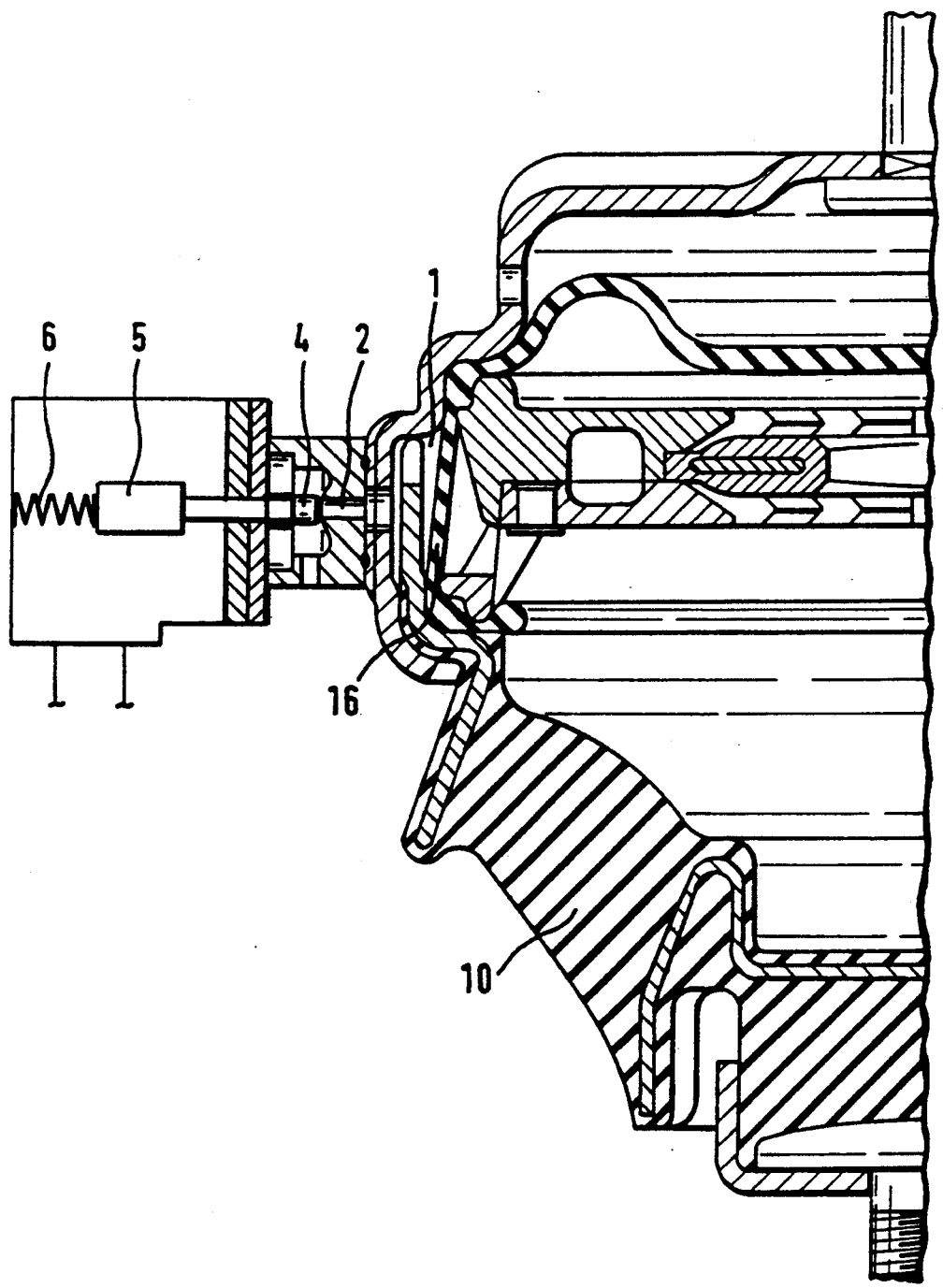
FIG. 2 shows an additional embodiment of an engine mounting, in which the check valve is integrated into the valve controlled by the switch.

If the valve 4 were electromagnetic, the control device would preferably send an electric current to open the valve, and cut off the electric current to enable the valve 4 to close again. This closing action can be effected by means of a spring 6 such as is shown in FIG. 2. The switched valve 4 could also be air activated, pneumatic, or liquid activated, hydraulic. Operation of such electric, hydraulic, or pneumatic switched valves is well known, and therefore not discussed in any further detail herein.

FIG. 2 illustrates an alternative embodiment, the operating principle of which is essentially the same as that of the embodiment illustrated in FIG. 1. In the embodiment of FIG. 2, the switch 4 can be energized by an electromagnet, whose magnet armature 5 is preferably braced against a spring 6. When the switch is de-energized, the spring 6, by means of the switch 4, keeps the flow connection 2 closed, whereby the spring 6 is designed so that as a result of the pumping action of the elastic circumferential wall 10 and the flexible wall 16, the switch 4 can rise against the spring 6, so that the intermediate space 1 can be evacuated, in a manner of operation similar to the check valve 3 of FIG. 1. In other words, when the electromagnet is not energized, the switch 4 can be considered to be a check valve, wherein the switch 4 is opened by the fluid pressure in intermediate space 1, and is closed by the force of the spring 6. If the electromagnet is energized, then by means of the magnet armature 5, the switch 4 can be opened against the force of the spring 6, so that an aeration of the intermediate space 1 from the atmosphere can take place.

In all the embodiments, the intermediate space 1 can preferably be sized so that a soft rigidity is provided, while still enabling evacuation to take place as rapidly as possible. To allow for this evacuation to be as rapid as possible, the shortest possible flow connection 2 is preferable, as well as a minimized volume, thereby avoiding any need to evacuate long flow connections as previously had to be done. Such a short flow connection 2 also enables the pumping action of the mounting alone to evacuate the intermediate space 1, wherein in prior devices, having sufficiently more air to be evacuated, such an evacuation may not have been feasible because of the compressibility of air. In other words, the pumping action may not have produced enough pressure to overcome the volume compressibility of the air to open a simple check valve.

Figure 3:
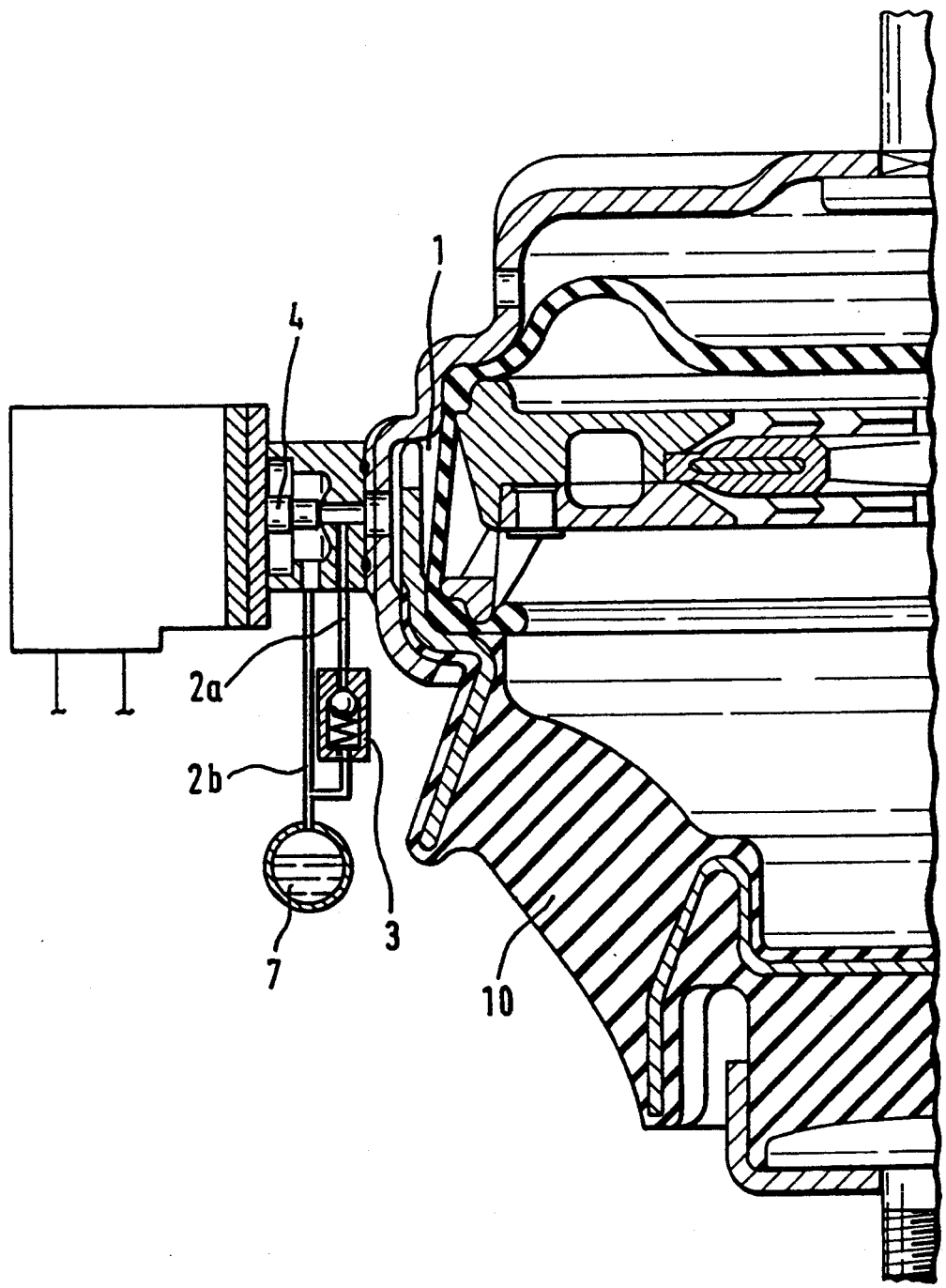
FIG. 3 shows a variant in which a pressure reservoir is located in the flow connection.

FIG. 3 illustrates one additional variant of the engine mounting, in which the flow connection 2a with the check valve 3, and the flow connection 2b connected to the passage 2 via the switched valve 4 are connected to a pressure reservoir 7. In this embodiment, when the switch 4 is opened, the intermediate space 1 is pressurized by a corresponding pressure present in the pressure reservoir 7, so that the bearing characteristic can be controlled. Otherwise, in this embodiment, too, the elastic circumferential wall 10 works via the check valve 3 on the pressure reservoir 7 to empty the intermediate space 1.

This embodiment of FIG. 3 enables the pressure of the system to be increased, or even decreased. That is, the pressure within the reservoir 7 can be greater than atmospheric pressure if so desired, or even slightly decreased below atmospheric pressure, to provide alternative damping characteristic to the mounting. In other words, if the pressure in the reservoir 7 and thus in the intermediate space 1, when the valve 4 is open, was to be increased to a positive pressure, that is, greater than atmospheric pressure, additional pumping action of the mounting would be needed to evacuate the intermediate space 1 to achieve the higher damping rigidity.

Figure 3A:
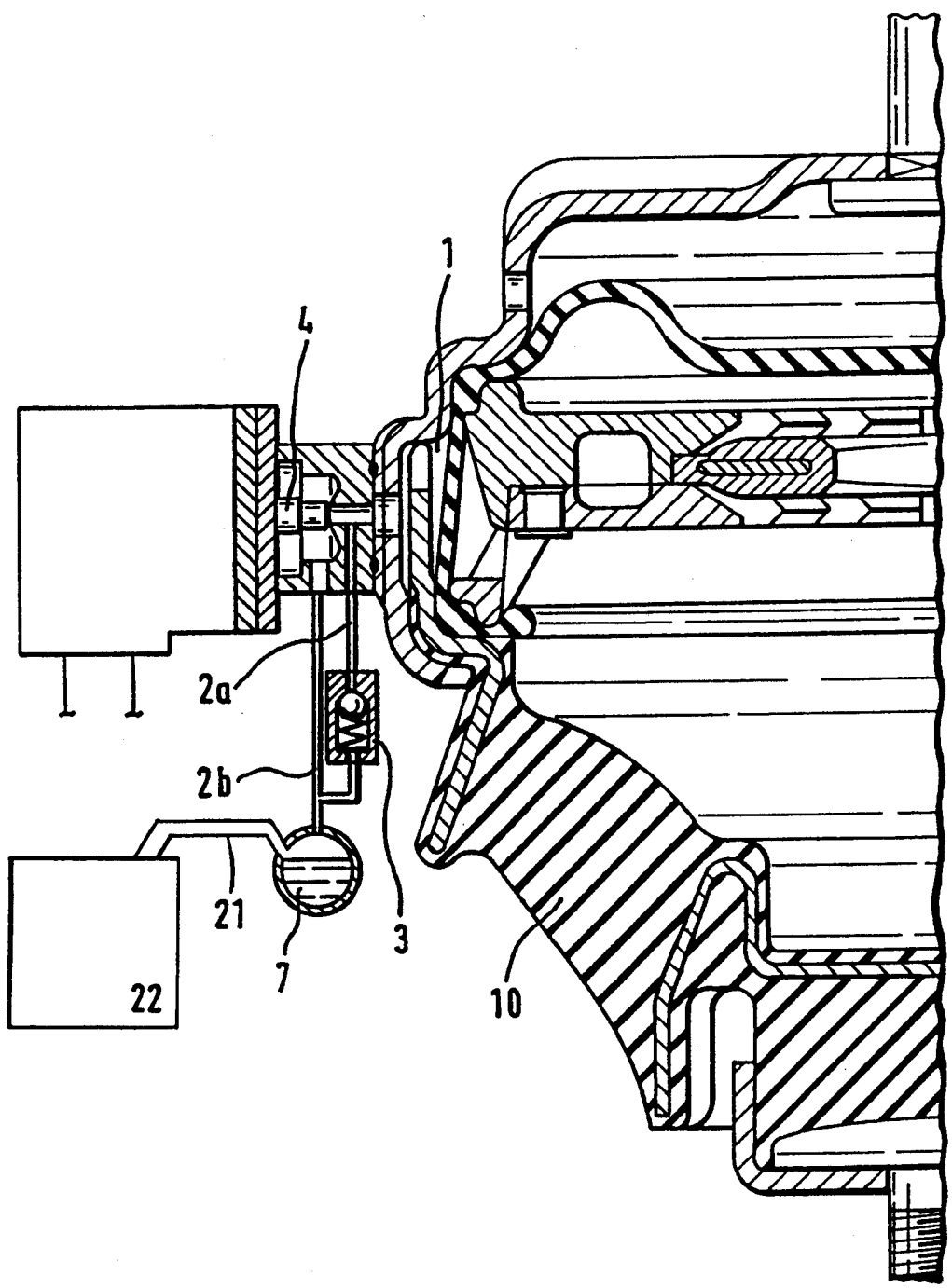
FIG. 3a shows a variant in which a pressure within the pressure reservoir can be adjusted to customize the damping effects of the mount.

The pressure within the system may also be variably adjustable, depending on the desired damping effect. As shown in FIG. 3a, this could be achieved by means of a connection 21 which can be used to introduce air into the reservoir 7 from a pressure supply source, or pump 22, to increase the pressure, or allow air to escape to reduce the pressure. Alternatively, a liquid could be present in the reservoir 7, and the volume of liquid could be increased or decreased to respectively increase or decrease the pressure exerted by the enclosed air.

One feature of the invention resides broadly in the hydraulic damping engine mounting with fluid-filled chambers at least partly bordered by elastic walls, and a membrane with limited excursion capability separating the membranes, with at least one passage connecting the chambers, whereby the bearing characteristic can be adjusted by changing the rigidity of a flexible wall located in one of the chambers which, at low rigidity, works against a gas volume enclosed in an intermediate space, and which, at high rigidity, comes into at least partial contact against a stop, characterized by the fact that the intermediate space 1 can be evacuated by means of at least one flow connection 2, whereby one of the flow connections 2a has a check valve 3 and can be pressurized via a flow connection 2b by means of a switch 4.

Another feature of the invention resides broadly in the engine mounting, characterized by the fact that the switch 4 can be activated manually, electromagnetically, pneumatically or hydraulically.

Yet another feature of the invention resides broadly in the engine mounting, characterized by the fact that the two flow connections 2a, 2b empty into a flow connection 2 which is connected to the intermediate space.

Still another feature of the invention resides broadly in the engine mounting, characterized by the fact that the check valve 3 is integrated into the switch 4.

Yet still another feature of the invention resides broadly in the engine mounting, characterized by the fact that when an electromagnetic switch 4 is used, the magnet armature 5 is designed directly or indirectly as the switch 4.

Another feature of the invention resides broadly in the engine mounting, characterized by the fact that the magnet armature 5, which closes the switch 4 by pressurizing a spring 6, is designed as a check valve 3.

Yet another feature of the invention resides broadly in the engine mounting, characterized by the fact that the cross section of the flow connection 2 is configured so that an unobstructed gas feed to the intermediate space 1 is guaranteed.

Still another feature of the invention resides broadly in the engine mounting, characterized by the fact that the switch 4 can be controlled as a function of the engine speed of a motor vehicle.

Yet still another feature of the invention resides broadly in the engine mounting, characterized by the fact that a control system automatically aerates the intermediate space 1 after the vehicle has been stationary for a long period of time.

Still yet another feature of the invention resides broadly in the engine mounting, characterized by the fact that flow connections 2a, 2b are connected to a pressure reservoir 7.

Some addition types of engine mountings having components and features similar to the engine mounting as described herein can be found in the following U.S. Patents, each of which has at least Jörn-Rainer Quast, the inventor of the present invention, as an inventor thereof: U.S. Pat. No. 4,645,189 to Quast, entitled "Hydraulic Damping Rubber Engine Mount"; U.S. Pat. No. 4,697,793 to Reuter, Quast, Maier and Brenner, entitled "Hydraulically Damped Elastic Engine Mount"; U.S. Pat. No. 4,781,362 to Reuter, Quast, Brenner, Maier and Meyer, entitled "Hydraulically Damping Elastic Bearing"; U.S. Pat. No. 4,955,588 to Reuter, Quast and Schall, entitled "Bearing for the Elastic Mounting of Machines, Machine Parts, and/or Vehicle Parts"; U.S. Pat. No. 5,149,067 to Fruhauf, Mayerbock and Quast, entitle "Bearing"; U.S. Pat. No. 5,205,545 to Quast, entitled "Elastic Rubber Bearing".

All, or substantially all, of the components and methods of the various embodiments may be used with at least one embodiment or all of the embodiments, if any, described herein.

The invention as described hereinabove in the context of the preferred embodiments is not to be taken as limited to all of the provided details thereof, since modifications and variations thereof may be made without departing from the spirit and scope of the invention.

Nomenclature
1 Intermediate space
2 Flow connection
3 Check valve
4 Switch
5 Magnet armature
6 Spring
7 Pressure reservoir
8 Fastening part
9 Fastening part
10 Elastic circumferential wall
11 Chamber
12 Chamber
13 Partition
14 Passage
15 Membrane
16 Flexible wall
17 Interior wall
20 Flexible membrane
21 Connection
22 Pressure source (pump)

What is claimed is:

1. A hydraulic damping engine mount for damping transmission of vibrations between an engine and a frame to which the engine is mounted, said mount having a damping rigidity, and said mount comprising:
first attachment means for attaching said mount to a frame;
second attachment means for attaching said mount to an engine;
at least one elastic wall disposed between and connecting said first attachment means and said second attachment means;
said first attachment means, said at least one elastic wall and said second attachment means comprise exterior surface portions of the mount and enclose an interior space within the mount, said interior space being bordered by an interior surface;

a first flexible member disposed within said interior space in spaced apart relationship from the interior surface, said first flexible member defining a first chamber within said interior space between said flexible member and said interior surface;

a fluid within said first chamber;

valve means for releasing fluid from said first chamber to increase the damping rigidity of said mount and for admitting fluid back into said first chamber to decrease the damping rigidity of said mount;

means for controlling said valve means to control release of fluid from said first chamber and control admission of fluid back into said first chamber;

said valve means being disposed immediately adjacent the exterior of said mount;

said mount defines a longitudinal axis extending through said first fastening means and said second fastening means said mount further comprises:
 partition means disposed within said interior space, said partition means dividing said interior space into second and third fluid chambers;
 damping fluid disposed within said second and third fluid chambers; and
 passage means disposed through said partition means for passage of the damping fluid between said second and third fluid chambers;

said second and third fluid chambers are disposed axially adjacent one another along said longitudinal axis;

said first flexible member is disposed within said second chamber to separate said first chamber from said second charier;

said at least one elastic wall substantially surrounds said second chamber;

said mount is configured for movement of said first fastening means towards said second fastening means via said at least one elastic wall to compress said second chamber and increase pressure in said first chamber via said first flexible member;

said valve means comprises a check valve, said check valve being configured for providing one-directional flow of fluid out of said first chamber at a first predetermined fluid pressure within said first fluid chamber to evacuate said first chamber and increase the rigidity of said mount;

said valve means further comprises a control valve for admitting air back into said first chamber, said control valve having an open position and a closed position, said control valve in said closed position being configured for evacuation of said first chamber via said check valve, and said control valve in said open position being configured for admitting air back into said first chamber to decrease the rigidity of said mount;

said means for controlling comprises means for moving said control valve between said open and closed positions;

said valve means further comprises:
 a first fluid passage providing fluid communication between said first chamber and the exterior of said mount;
 a second fluid passage exterior of said mount and in fluid communication with said first fluid passage, said second fluid passage comprising said check valve;
 a third fluid passage exterior of said mount and in fluid communication with said first fluid passage, said third fluid passage comprising said control valve; said means for moving comprises one of:
 manual activation means,
 electromagnetic activation means,
 hydraulic activation means, and
 pneumatic activation means,
for moving said control valve between said open and closed position;

said mount comprises an engine mount for mounting an engine in a motor vehicle, the engine being configured to move the motor vehicle;

said means for controlling is configured to close said control valve at at least a first operating speed of a motor vehicle engine, and to open said control valve at at least an idling speed of a motor vehicle engine;

said means for controlling further comprises means for automatically opening said control valve after a motor vehicle has been stationary for a predetermined period of time;

said first chamber is disposed circumferentially about said longitudinal axis and circumferentially about at least a portion of said second chamber;

said partition comprises a second flexible member;

said first flexible member and said second flexible member each have a rigidity;

said rigidity of said first flexible member is less than the rigidity of the second flexible member for movement of said first flexible member before movement of said second flexible member;

said first flexible member is configured to be movable during evacuation of said first chamber until at least a portion of said first flexible member contacts said interior surface of said mount; and said second flexible member is configured to be movable after said at least a portion of said first flexible member contacts said interior surface.

2. The mount according to claim 1, wherein:

said first fluid passage has a cross-section, and said cross-section being configured to comprise an unobstructed feed to said first chamber;

said fluid within said first chamber comprises air;

said second fluid passage and said third fluid passage each open into the same one of:
 the atmosphere; and
 a pressure reservoir, the pressure reservoir being configured to have an air pressure different from atmospheric pressure;

said first chamber, said first fluid passage, and said second fluid passage are configured to minimize a volume of said first chamber, said first fluid passage, and said second fluid passage;

said control means comprises said electromagnetic activation means; and said electromagnetic activation means comprises an electromagnetic armature, and said electromagnetic armature is one of:
 directly connected to said control valve means, and
 indirectly connected to said control valve means, to open and close said control valve means upon activation of said electromagnetic armature.

3. The mount according to claim 2, wherein:

said mount is substantially cylindrical;

each of said first and said second fastening means comprise bowl shaped rigid members;

each of said first and said second fastening means comprise bolt fasteners disposed disposed along the central longitudinal axis of said mount;

said partition means comprise a disc-shaped partition disposed substantially perpendicularly to said central longitudinal axis within said interior space;

said disc-shaped member comprising:
  a first side surface disposed towards said second fluid chamber, and a second side surface disposed towards said third fluid chamber;
  a substantially rigid ring-shaped member defining a central opening therein, said ring-shaped member having a V-shaped groove disposed about said central opening;
  said second flexible member disposed within said V-shaped groove to span said central opening, said second flexible member having a circumferential edge disposed within said V-shaped groove, and said second flexible member comprising a disc-shaped reinforcement ring disposed about said second flexible member adjacent said circumferential edge; and
  said passage means, wherein said passage means comprises a first opening into said second fluid chamber at said first side of said disc-shaped member,
  a second opening into said third fluid chamber at said second side of said disc-shaped member, and a connecting passage disposed circumferentially about said ring-shaped member and connecting said first opening to said second opening;

said mount comprises a third flexible member disposed adjacent said second side of said disc-shaped member, said third fluid chamber being disposed between said third flexible member and said disc-shaped member;

an air chamber disposed between said second fastening means and said third flexible member;

said third flexible member comprises bellow folds configured to be expandable into said air space;

said second fastening means comprises an orifice therethrough connecting said air space to the atmospheric air;

said first flexible member and said third flexible member are formed by an integral bowl-shaped elastomeric membrane having a base portion comprising said third flexible member and a cylindrical side portion comprising said first flexible member;

said disc-shaped member is disposed within said bowl-shaped elastomeric membrane, and said bowl shaped elastomeric membrane is disposed within said second bowl-shaped fastening means;

said at least one elastic wall comprises a dome shaped elastomeric member having a first end and a second end, said first end having a circumference less than a circumference of said second end;

said second end of said elastomeric dome comprises a first rigid flange means extending axially therefrom, said rigid flange means extending between said cylindrical side portions of said bowl-shaped elastomeric member and said second fastening means;

said first rigid flange means comprises a circumferential groove;

said second fastening means comprising a flange extending into said circumferential groove of said first rigid flange to join together said at least one elastic wall and said second fastening means;

said first end of said dome-shaped member comprises a second rigid flange means, said second rigid flange means having a base portion with a cylindrical wall extending therefrom;

at least a portion of said first fastening means is disposed within said cylindrical wall of said second rigid flange means; and said mount further comprises an additional elastomeric block disposed between said second rigid flange means and said first fastening means.

4. A hydraulic damping bearing for damping transmission of vibrations between a first object and a second object, said bearing having a damping rigidity, and said bearing comprising:

first attachment means for attaching said bearing to the first object;

second attachment means for attaching said bearing to the second object;

at least one elastic wall disposed between and connecting said first attachment means and said second attachment means;

said first attachment means, said at least one elastic wall and said second attachment means comprise exterior surface portions of the bearing and enclose an interior space within the bearing, said interior space being bordered by an interior surface;

a first flexible member disposed within said interior space in spaced apart relationship from the interior surface, said first flexible member defining a first chamber within said interior space between said flexible member and said interior surface;

a fluid within said first chamber;

first passage means from said first chamber to the exterior of said bearing;

valve means configured for releasing fluid through said first passage .means out of said first chamber and admitting fluid through said first passage means back into said first chamber;

said valve means comprising:
  check valve means configured for providing one-directional flow of fluid out of said first chamber via said first fluid passage at a first predetermined fluid pressure within said first fluid chamber to thereby evacuate said first chamber and increase the rigidity of said bearing; and
  means for opening said first fluid passage to admit fluid back into said first chamber to decrease the damping rigidity of said bearing;

said device further comprises means for controlling said means for opening said first fluid passage to control admission of fluid back into said first chamber;

said check valve means has a closed position and an open position, and said check valve means comprises a resilient member applying a force against said check valve means to retain said check valve means in the closed position against the pressure of the fluid in said first chamber, said resilient member being configured to allow said check valve to move to the open position at said first predetermined pressure within said first chamber;

said means for opening said first fluid passage comprises means for opening said check valve means and retaining said check valve means in the open position irrespective of the fluid pressure in said first chamber;

said means for controlling said means for opening comprises means for activating said means for opening to open said check valve means against the force of said resilient member;

said means for activating comprises an electromagnet, the electromagnet comprising an armature, and the armature of the electromagnet being one of:
   directly connected to said check valve means, and
   indirectly connected to said check valve means to open said check valve means upon activation of said electromagnet;

said bearing comprises an engine mount for mounting an engine in a motor vehicle;

said means for controlling further comprises:
   sensor means for measuring a speed of an engine; and
   means for operating said means for activating as a function of a measured speed;

said mount defines a longitudinal axis extending through said first fastening means and said second fastening means;

said mount further comprises:
   partition means disposed within said interior space, said partition means dividing said interior space into second and third fluid chambers;
   damping fluid disposed within said second and third fluid chambers; and
   passage means disposed through said partition means for passage of the damping fluid between said second and third fluid chambers;

said second and third fluid chambers are disposed axially adjacent one another along said longitudinal axis;

said first flexible member is disposed within said second chamber to separate said first chamber from said second chamber;

said at least one elastic wall substantially surrounds said second chamber;

said mount is configured for movement of said first fastening means towards said second fastening means via said at least one elastic wall to compress said second chamber and increase the fluid pressure in said first chamber via said first flexible member;

said valve means further comprises:
   a first fluid passage providing fluid communication between said first chamber and the exterior of said mount;
   a second fluid passage exterior of said mount and in fluid communication with said first fluid passage, said second fluid passage comprising said check valve; and
   a third fluid passage exterior of said mount and in fluid communication with said first fluid passage, said third fluid passage comprising said control valve;

said first chamber is disposed circumferentially about said longitudinal axis and circumferentially about at least a portion of said second chamber;

said partition comprises a second flexible member;

said first flexible member and said second flexible member each have a rigidity;

said rigidity of said first flexible member is less than the rigidity of the second flexible member for movement of said first flexible member before movement of said second flexible member;

said first flexible member is configured to be movable during evacuation of said first chamber until at least a portion of said first flexible member contacts said interior surface of said mount;

said second flexible member is configured to be movable after said at least a portion of said first flexible member contacts said interior surface; and said valve means is disposed immediately adjacent and directly fastened to the exterior of said mount.

5. The bearing according to claim 4 wherein:

said first fluid passage has a cross-section, and said cross-section being configured to comprise an unobstructed feed to said first chamber;

said fluid within said first chamber comprises air;

said second fluid passage and said third fluid passage each open into the same one of:
   the atmosphere; and
   a pressure reservoir, the pressure reservoir being configured to have an air pressure different from atmospheric pressure;

said first chamber, said first fluid passage, and said second fluid passage being configured to minimize a volume of said first chamber, said first fluid passage, and said second fluid passage;

said control means comprises said electromagnet; and said electromagnet comprises an electromagnetic armature, and said electromagnetic armature is one of:
   directly connected to said control valve means, and
   indirectly connected to said control valve means, to open and close said control valve means upon activation of said electromagnetic armature.

6. The bearing according to claim 5, wherein:

said mount is substantially cylindrical;

each of said first and said second fastening means comprise bowl shaped rigid members;

each of said first and said second fastening means comprise bolt fasteners disposed disposed along the central longitudinal axis of said mount;

said partition means comprise a disc-shaped partition disposed substantially perpendicularly to said central longitudinal axis within said interior space;

said disc-shaped member comprising:
   a first side surface disposed towards said second fluid chamber, and a second side surface disposed towards said third fluid chamber;
   a substantially rigid ring-shaped member defining a central opening therein, said ring-shaped member having a V-shaped groove disposed about said central opening;
   said second flexible member disposed within said V-shaped groove to span said central opening, said second flexible member having a .circumferential edge disposed within said V-shaped groove, and said second flexible member comprising a disc-shaped reinforcement ring disposed about said second flexible member adjacent said circumferential edge; and
   said passage means, wherein said passage means comprises a first opening into said second fluid chamber at said first side of said disc-shaped member, a second opening into said third fluid chamber at said second side of said disc-shaped member, and a connecting passage disposed circumferentially about said ring-shaped member and connecting said first opening to said second opening;

said mount comprises a third flexible member disposed adjacent said second side of said disc-shaped member, said third fluid chamber being disposed between said third flexible member and said disc-shaped member;

an air chamber disposed between said second fastening means and said third flexible member;

said third flexible member comprises bellow folds configured to be expandable into said air space;

said second fastening means comprises an orifice therethrough connecting said air space to the atmospheric air;

said first flexible member and said third flexible member are formed by an integral bowl-shaped elastomeric membrane having a base portion comprising said third flexible member and a cylindrical side portion comprising said first flexible member;

said disc-shaped member is disposed within said bowl-shaped elastomeric membrane, and said bowl shaped elastomeric membrane is disposed within said second bowl-shaped fastening means;

said at least one elastic wall comprises a dome shaped elastomeric member having a first end and a second end, said first end having a circumference less than a circumference of said second end;

said second end of said elastomeric dome comprises a first rigid flange means extending axially therefrom, said rigid flange means extending between said cylindrical side portions of said bowl-shaped elastomeric member and said second fastening means;

said first rigid flange means comprises a circumferential groove;

said second fastening means comprising a flange extending into said circumferential groove of said first rigid flange to join together said at least one elastic wall and said second fastening means;

said first end of said dome-shaped member comprises a second rigid flange means, said second rigid flange means having a base portion with a cylindrical wall extending therefrom;

at least a portion of said first fastening means is disposed within said cylindrical wall of said second rigid flange means; and said mount further comprises an additional elastomeric block disposed between said second rigid flange means and said first fastening means.

* * * * *

UNITED STATES PATENT AND TRADEMARK OFFICE
CERTIFICATE OF CORRECTION

PATENT NO. : 5,386,977
DATED : February 7, 1995
INVENTOR(S) : Jörn-Rainer QUAST

It is certified that error appears in the above-indentified patent and that said Letters Patent is hereby corrected as shown below:

In column 2, line 11, after 'to', delete "Occur" and insert --occur--.

In column 4, line 64, after 'details', delete "there regarding" and insert --thereregarding--.

In column 9, line 35, Claim 1, after 'second', delete "charier" and insert --chamber--.

Signed and Sealed this

Fifth Day of November, 1996

Attest:

BRUCE LEHMAN

Attesting Officer

Commissioner of Patents and Trademarks